United States Patent
Li

(10) Patent No.: US 8,810,749 B2
(45) Date of Patent: Aug. 19, 2014

(54) BACKLIGHT SOURCES HAVING REDUCED THICKNESS AND LIQUID CRYSTAL DISPLAY DEVICE USING THE SAME

(75) Inventor: Yi Li, Pleasanton, CA (US)

(73) Assignee: Appotronics Ltd., Shenzhen (CN)

( * ) Notice: Subject to any disclaimer, the term of this patent is extended or adjusted under 35 U.S.C. 154(b) by 2 days.

(21) Appl. No.: 13/381,912

(22) PCT Filed: Jul. 1, 2010

(86) PCT No.: PCT/CN2010/000990
§ 371 (c)(1),
(2), (4) Date: Feb. 14, 2012

(87) PCT Pub. No.: WO2011/000219
PCT Pub. Date: Jan. 6, 2011

(65) Prior Publication Data
US 2012/0242934 A1  Sep. 27, 2012

(30) Foreign Application Priority Data

Jul. 1, 2009 (CN) .......................... 2009 1 0108498

(51) Int. Cl.
*G02F 1/1335* (2006.01)
*G09F 13/04* (2006.01)
*F21V 7/04* (2006.01)

(52) U.S. Cl.
USPC ................ 349/62; 349/61; 349/64; 362/97.2; 362/612; 362/615

(58) Field of Classification Search
CPC .................... G02F 1/133602; G02F 1/133603; G02F 1/133605; G02F 1/133606; G02F 1/133611; G02B 6/0031; G02B 6/0028; G02B 6/0091; G02B 6/0073
USPC ................ 349/64, 61, 62; 362/97.2, 612, 615
See application file for complete search history.

(56) References Cited

U.S. PATENT DOCUMENTS 5,262,880 A    11/1993    Abileah
7,052,152 B2    5/2006    Harbers et al.
(Continued)

FOREIGN PATENT DOCUMENTS

CN    1542513      11/2004
CN    1763606 A    4/2006
(Continued)

OTHER PUBLICATIONS

IPRP in the parent PCT application No. PCT/CN2010/000990, dated Oct. 14, 2010.
(Continued)

*Primary Examiner* — Michael Caley
*Assistant Examiner* — Jia Pan
(74) *Attorney, Agent, or Firm* — Chen Yoshimura LLP

(57) ABSTRACT

A backlight source and a thinning method for the same are provided. The backlight source includes: a solid state light source array having a plurality of solid state light sources distributed on the base, a light transmitting unit arranged above the solid state light source array, and a plurality of light adjusting units arranged between the solid state light source array and the light transmitting unit. The plurality of the light adjusting units is arranged above the plurality of solid state light sources to reflect the shallow angle incident light from the solid state light source, thus changes the light intensity distribution of the output light through the light transmitting unit from the solid state light sources from Lambertian distribution to main sides emission.

12 Claims, 4 Drawing Sheets

(56) References Cited

U.S. PATENT DOCUMENTS

| | | | |
|---|---|---|---|
| 7,762,705 B2 * | 7/2010 | Sakai et al. | 362/619 |
| 7,834,952 B2 * | 11/2010 | Lee et al. | 349/62 |
| 7,973,878 B2 * | 7/2011 | Whitehead | 349/64 |
| 2002/0097578 A1 * | 7/2002 | Greiner | 362/240 |
| 2005/0248848 A1 | 11/2005 | Whitehead et al. | |
| 2005/0270654 A1 | 12/2005 | Goto et al. | |
| 2006/0066773 A1 | 3/2006 | Huang | |
| 2006/0087827 A1 * | 4/2006 | Jung et al. | 362/29 |
| 2006/0291238 A1 | 12/2006 | Epstein et al. | |
| 2007/0159573 A1 | 7/2007 | Lee et al. | |
| 2007/0274098 A1 * | 11/2007 | Wheatley et al. | 362/609 |

FOREIGN PATENT DOCUMENTS

| | | | | |
|---|---|---|---|---|
| CN | 101256307 A * | 9/2008 | | |
| CN | 201246632 Y | 5/2009 | | |
| WO | 2009022284 | 2/2009 | | |
| WO | WO 2009022284 A1 * | 2/2009 | | G02B 6/00 |

OTHER PUBLICATIONS

Chinese Office Action, dated Dec. 19, 2011, in a counterpart Chinese patent application, No. CN 200910108498.2.

International Search Report in the parent PCT application No. PCT/CN2010/000990, dated Oct. 14, 2010.

Written Opinion of the International Search Authority in the parent PCT application No. PCT/CN2010/000990, dated Oct. 14, 2010.

Extended European Search Report, dated Mar. 25, 2013, in a counterpart European patent application, No. EP 10793514.0.

Chinese Office Action, dated Aug. 23, 2012, in a counterpart Chinese patent application, No. CN 200910108498.2.

* cited by examiner

BACKLIGHT SOURCES HAVING REDUCED THICKNESS AND LIQUID CRYSTAL DISPLAY DEVICE USING THE SAME

This is a U.S. National Stage application of PCT/CN2010/000990, filed Jul. 1, 2010, which claims priority from Chinese patent application CN 200910108498.2, filed Jul. 1, 2009, both of which are herein incorporated by reference in their entireties.

BACKGROUND OF THE INVENTION

1. Field of the Invention

This invention relates to a device to control the intensity or direction of light from independent light sources, and in particular, such a device useful in a backlight source of liquid crystal display (LCD) devices.

2. Description of the Related Art

A typical LCD device includes a light source system with a number of monochromatic light sources, such as and not limited to, red light source, green light source, and blue light source, generating red (R), green (G), and blue (B) lights, respectively. Because the liquid crystal can only modulate the light intensity but cannot produce light itself, the light source system is generally a surface light source that is placed behind and illuminates the liquid crystal panel, commonly referred to as backlight source.

Currently, the following schemes of LCD devices and their backlight sources are in use.

The first one uses a light source side-coupling method. Its structural mechanism is shown in FIG. 1. The light source is placed at the side of a wedge-shaped light guide plate. The upper surface of this light guide plate generally has some microstructures for light scattering. This way, when the light is injected into the light guide plate from the side, it transmits out from the upper surface while propagating forward, and enters transmission type or semi-transmission/semi-reflection type liquid crystal panel 4. The microstructures help to scatter the outgoing light from the surface light source. The light source can be cold-cathode fluorescent lamps (CCFL) often used in traditional CCFL displays, or solid state light source, such as and not limited to, light emitting diodes (LED). For example, for most of today's mobile phones, the backlights of their liquid crystal screen use white LEDs.

The second scheme is the light source back-coupling method. Its structural mechanism is shown in FIG. 2. A light source, for example an array of LEDs 1, is placed at the back of the liquid crystal panel 4 to illuminate the liquid crystal panel directly. To solve the problem of uniformity of the outgoing light from the surface light source, a scattering body 51 and a scattering surface 52 are often inserted in between the array of LEDs 1 and the liquid crystal panel 4 to form a sufficiently large scattering space to achieve a uniform distribution of the outgoing light. U.S. Pat. No. 7,052,152 B2 discloses such a backlight source which also includes a layer of wavelength conversion material. The wavelength conversion material converts excitation light from the array of LEDs into excited light and provides the excited light to illuminate the liquid crystal panel. This patent also discloses various electrical connections of respective LED in the array of LEDs.

The third scheme is a combination of the light source side-coupling and the light source back-coupling method. For example, Chinese patent application No. 03123095 discloses a backlight module including a light guide plate, a side light source, and a back light source.

There are shortcomings for the existing techniques mentioned above. For the first scheme of using light source side-coupling method, it is difficult for the light guide plate to ensure that the liquid crystal panel is uniformly illuminated when the size of liquid crystal panel is large. The display brightness of the portion of the screen that is far away from the side light source is especially difficult to be controlled or guaranteed. Even adopting double side-coupling for improvement, the size of the liquid crystal panel is still limited due to the non-uniformity of display brightness. Besides, the total thickness of this type of backlight source depends on the width of the light source and the thickness of the light guide plate, and thus it is difficult to make it ultra thin.

For the second scheme of using light source back-coupling method, although it can overcome the screen size-limit problem mentioned above, the necessary existence of the scattering body or the scattering space not only reduces the light transmission efficiency but also increases the total thickness of the backlight module. If the scattering body or the scattering space is reduced in order to make the device ultra thin, the occurrence of red, blue or green light spots may be unavoidable due to the insufficient mixture of red, green, and blue light.

For the third scheme of combining the side-coupling and the back-coupling method, although it overcomes the shortcoming of the previous two methods, there is still some degree of thickness requirement for the backlight source.

SUMMARY OF THE INVENTION

The present invention aims to solve the technical problems and the shortcomings of the existing technologies mentioned above. Embodiments of the present invention provide a backlight source and a method to reduce its thickness which substantially eliminates the size limitation of the liquid crystal panel and minimizes the thickness of the backlight source so as to reduce the overall thickness of the LCD device, without compromising the uniformity of the outgoing light.

To address the above technical problems, the basic principles of the present invention are as followings. To make backlight sources adaptable to different sizes of liquid crystal panels, it is preferred to use solid state light sources, such as arrays of LEDs, and use back-coupling. Since the intensity of light emitted from LEDs generally follows the Lambertian distribution (cosine distribution), existing technologies use a large enough scattering space to ensure the uniform illumination of liquid crystal panels and prevent the occurrence of light spots. In embodiments of the present invention, the above light distribution is changed by reducing the intensity of small angle outgoing light and increasing the intensity of large angle outgoing light. Because large angle light has a longer light path and a larger range of irradiation when propagating forward, the uniform mixture of red, green, and blue light can be achieved in a smaller scattering space, which can reduce the thickness of the backlight source.

To achieve these and other advantages and in accordance with the purpose of the present invention, as embodied and broadly described, the present invention provides a method for making a backlight source with reduced thickness, which includes: placing a solid state light source array including a plurality of solid state light sources below a light transmitting unit; wherein the light emitted by the solid state light sources are transmitted through the light transmitting unit as an output light of the backlight source; and placing a plurality of light adjusting units between the solid state light source array and the light transmitting unit, above the plurality of solid state light sources, wherein each light adjusting unit spatially corresponds to one solid state light source to reflect small-angle emitted light from the solid state light source back to the solid state light source, wherein the solid state light source reflects or scatters the light reflected from the light adjusting unit back to the light transmitting unit at various angles, whereby a spatial distribution of light intensity of the light from the solid state light sources to the light transmitting unit is adjusted by the light adjusting units.

More specifically, a distance between the light adjusting unit and the corresponding solid state light source is between 1/5 and 1/10 of a bounding circle diameter of the light emitting area of the solid state light source. Each light adjusting unit includes an edge-emitting filter plate or film which reflects incident lights having incident angles smaller than a threshold angle and transmits incident lights having incident angles larger than or equal to the threshold angle. When the solid state light source array includes a plurality of solid state light sources emitting lights of different wavelengths, each edge-emitting filter plate or film selectively transmits incident light within a predetermined wavelength range, the predetermined wavelength range corresponding to a wavelength range of lights emitted by the solid state light source which is spatially corresponded to the edge-emitting filter plate or film. When the plurality of solid state light sources emit lights of the same wavelength, the plurality of edge-emitting filter plates or films are spatially joined to form one plate or film. Further, a low refractive index medium having a refractive index below 1.3 is provided between the edge-emitting filter plates or films and the solid state light sources; or an air gap is provided between the edge-emitting filter plates or films and the solid state light sources. The light transmitting unit may be a light transmitting plate having a plurality of recesses, each recess being located to accommodate one edge-emitting filter plate or film and one corresponding solid state light source. The thickness of the light transmitting plate can be less than 5 mm.

In one embodiment, each light adjusting unit includes a reflector disposed at a predetermined distance above a corresponding solid state light source to reflect small-angle lights from the solid state light source, and one or more reflective surfaces are provided between the plurality of solid state light sources or below the plurality of solid state light sources. Each reflector has an area substantially the same as an light emitting area of the corresponding solid state light source, and a distance between the reflector and the corresponding solid state light source is between 1/5 and 1/10 of a bounding circle diameter of the light emitting area of the solid state light source.

In another aspect, the present invention provides a backlight source which includes: a base; a solid state light source array including a plurality of solid state light sources disposed on the base; a light transmitting unit disposed above the solid state light source array; and a plurality of light adjusting units disposed between the solid state light source array and the light transmitting unit, wherein each light adjusting unit spatially corresponds to one solid state light source to reflect small-angle emitted light from the solid state light source back to the solid state light source.

More specifically, the light transmitting unit is a light transmitting plate with a predetermined a thickness, and each light adjusting unit includes an edge-emitting filter plate disposed adjacent the light transmitting plate or an edge-emitting filter film coated on the light transmitting plate, to reflect incident lights having incident angles smaller than a threshold angle and transmits incident lights having incident angles larger than or equal to the threshold angle. When the plurality of solid state light sources emit lights of the same wavelength, the plurality of edge-emitting filter plates or films are spatially joined to form one plate or film. The light transmitting plate has a plurality of recesses on its bottom, the light transmitting plate cooperating with the base to accommodate one edge-emitting filter plate or film and one corresponding solid state light source in each recess. A distance between each edge-emitting filter plate or film and the corresponding solid state light source is less than 1/5 of a bounding circle diameter of a light emitting area of the solid state light source.

In one embodiment, the light transmitting unit is a light transmitting plate with a predetermined thickness and having a plurality of recesses on its bottom, the light transmitting plate cooperating with the base to accommodate one light adjusting unit and one corresponding solid state light source in each recess; each light adjusting unit includes a first reflector plate disposed adjacent a bottom of the corresponding recess or a first reflective film coated on the bottom of the corresponding recess; and the backlight source further includes either a second reflective film coated on either the light transmitting plate or the base at locations where the light transmitting plate and the base contact each other, or a second reflector plate sandwiched between the light transmitting plate and the base. A distance between each light adjusting unit and the corresponding solid state light source is between 1/5 and 1/10 of a bounding circle diameter of the light emitting area of the solid state light source.

In one embodiment, the base has polished surfaces or reflective regions formed of a reflective material located in spaces between the plurality of solid state light sources; the plurality of light adjusting units include a plurality of reflective regions formed on a light transmitting plate; and the light transmitting unit is a diffuser plate located above the light transmitting plate. The backlight source further includes a transparent material disposed between the base and the light transmitting plate.

In another aspect, the present invention provides a liquid crystal display device which includes a liquid crystal panel and a backlight source as described above.

It is to be understood that both the foregoing general description and the following detailed description are exemplary and explanatory and are intended to provide further explanation of the invention as claimed.

DETAILED DESCRIPTION OF THE PREFERRED EMBODIMENTS

Embodiments of the present invention are described in more detail below with reference to the drawings.

As described earlier, a method for a conventional backlight source to provide outgoing light includes the following steps:

Providing a backlight source by placing an array of a plurality of solid state light sources below a light transmitting unit. The solid state light source may be an LED but is not limited thereto. The light transmitting unit may be a light guide plate but is not limited thereto.

Light emitted from the solid state light source transmits through the light transmitting unit, and provides outgoing light of the backlight source.

To reduce the thickness of a backlight source, a method according to embodiments of the present invention improves upon the above described method as follows:

Between the array of solid state light sources and the light transmitting unit, a plurality of light adjusting units are placed above the plurality of the solid state light sources. Each light adjusting unit corresponds in position with one solid state light source and reflects small angle incident light from the solid state light source, so that light intensity distribution of outgoing light of the light transmitting unit changes from a Lambertian distribution (containing mainly small angle outgoing light, as shown in the characteristics curve in FIG. 10) to a distribution containing mainly large (wide) angle outgoing light. In particular, the small angle incident light from the solid state light sources is reflected back to the array of solid state light sources. When such light is reflected or scattered by the array of solid state light sources back to the light adjusting units, its incident angle is changed. After one or more such cycles, the light is eventually outputted as large angle light. This improves or ensures the brightness of the light source.

A backlight source according to embodiments of the present invention includes a solid state light source array having a plurality of solid state light sources distributed on a base, a light transmitting unit arranged above the solid state light source array, and a plurality of light adjusting units disposed between the solid state light source array and the light transmitting unit. Each light adjusting unit corresponds in position with one solid state light source in order to reflect small angle incident light from the solid state light source.

Figure 1:
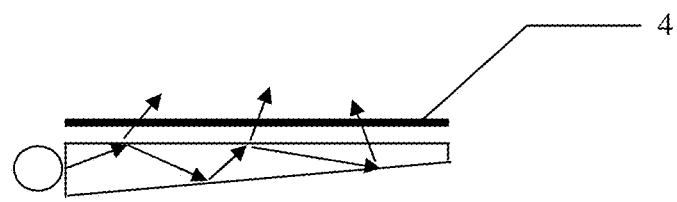
FIG. 1 schematically illustrates a first backlight source of a conventional LCD device.
Figure 2:
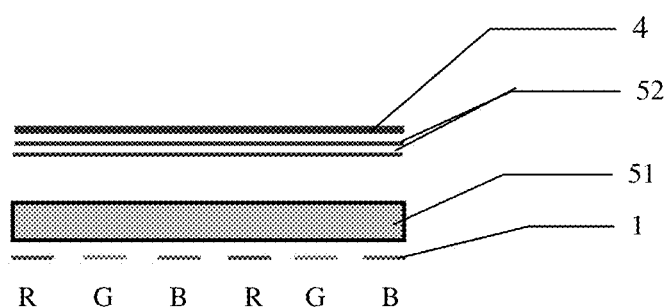
FIG. 2 schematically illustrates a second backlight source of a conventional LCD device.
Figure 3:
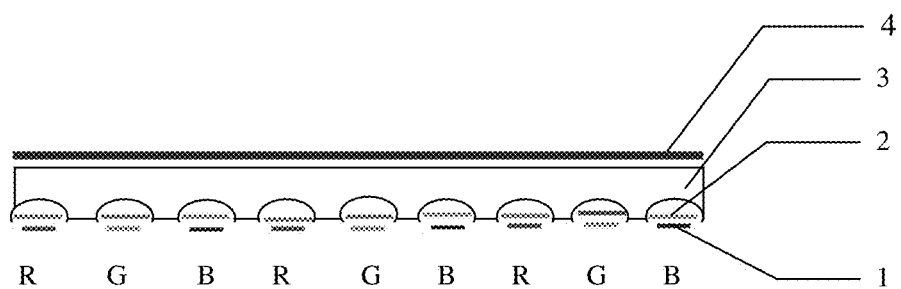
FIG. 3 schematically illustrates a backlight source of a LCD device according to a first embodiment of the present invention.
Figure 5:
FIG. 5 schematically illustrates a backlight source of a LCD device according to a second embodiment of the present invention.

FIG. 3 and FIG. 5 illustrate two backlight sources according to embodiments of the present invention. The array of solid state light sources 1 is distributed on the base (not shown). The light transmitting unit may be the light transmitting plate 3 with a certain thickness. The light adjusting units may be edge-emitting filter plates or films to reflect the incident light having incident angles less than a threshold angle and transmit light having incident angles greater than or equal to the threshold angle. This light adjusting unit can be the edge-emitting filter 2 disposed immediately adjacent to the light transmitting plate 3 as shown in FIG. 3, or it can be an edge-emitting film 2' coated on the light transmitting plate as shown in FIG. 5. In the structure of FIG. 3, to make the backlight module as thin as possible, the light emitting plate 3 is provided with a plurality of recesses. The edge-emitting filter plates 2 and the solid state light sources 1 are disposed inside the corresponding recesses.

Figure 4:
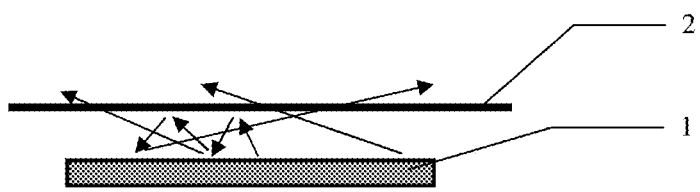
FIG. 4 schematically illustrates an edge-emitting filter used in the embodiment of FIG. 3.

FIG. 4 schematically illustrates the operation of an edge-emitting filter plate. Wider angle incident lights from solid state light sources, such as and not limited to, LEDs, penetrate the edge-emitting filter 2, while smaller angle incident lights will be reflected by edge-emitting filter 2 back to LED surface and are scattered or diffused by the LED surface. Smaller angle incident lights are recycled multiple times in this manner between the LED surface 1 and the edge-emitting filter 2. The light may be lost or eventually penetrate the edge-emitting filter 2 as wider angle light. After light is recycled in this manner, the wide angle light emitted by the LED toward the light transmitting plate 3 can be greatly enhanced. Having too large a distance between the solid state light source 1 and the edge-emitting filter plate 2 is undesirable for large-angle output of lights from peripheral areas of the solid state light sources. Thus, methods according to embodiments of the present invention control the distance between the edge-emitting filter plate or film and the solid state light sources. Test calculations show that this distance should be less than ⅕ of a bounding circle diameter of the solid state light source and, the smaller the better.

Figure 9:
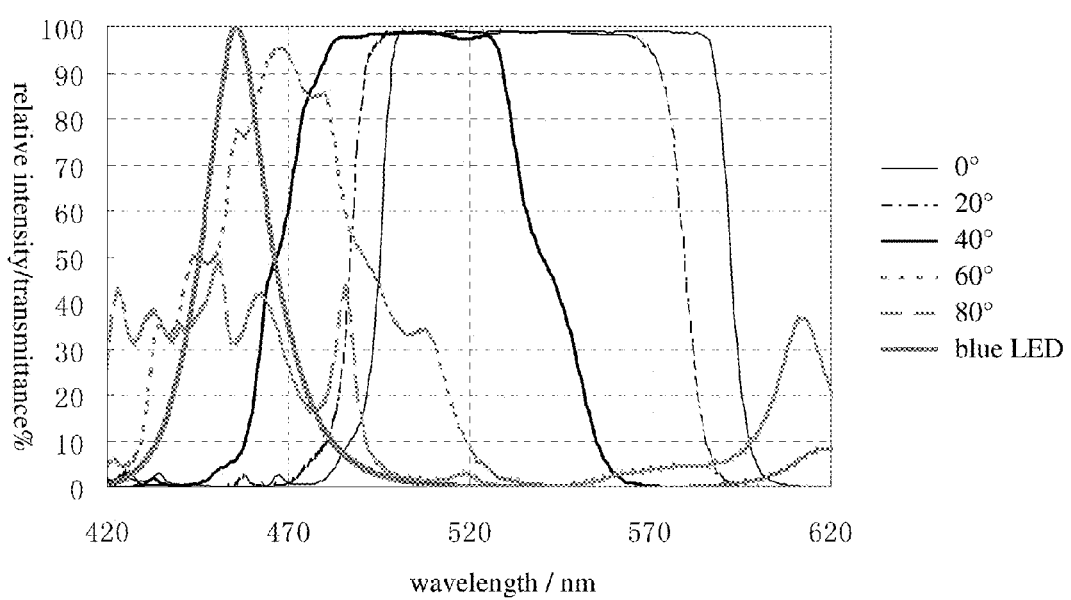
FIG. 9 shows an example of light transmission characteristics of the edge-emitting filter for the blue LED in FIG. 3.
Figure 10:
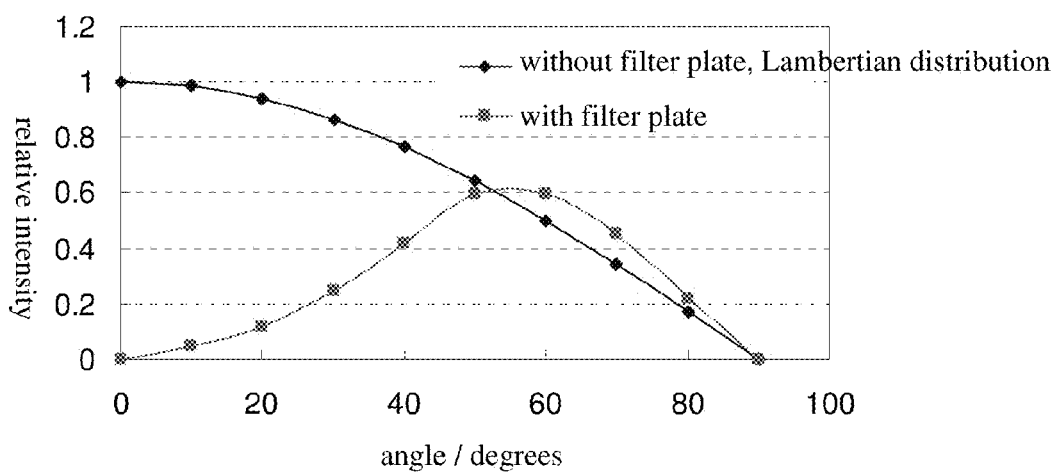
FIG. 10 shows a comparison of the outgoing light distribution for the LED in FIG. 8 with and without the filter.

An array of solid state light sources for projection display systems often includes solid state light sources emitting at multiple different wavelengths. In order to achieve better mixture of lights to obtain a more uniform light, the edge-emitting filter plate or film according to embodiments of the present invention also has selective light transmission characteristics based on the wavelength of the incident lights. The selected transmission wavelength range of a filter corresponds to the wavelength range of the light emitted by the corresponding solid state light source. FIG. 9 shows an example of light transmission characteristics of an edge-emitting filter plate 2 for a blue LED. As shown in this figure, light emitted from the blue LED is concentrated in the 450 nm range. In this range, the edge-emitting filter plate 2 mainly reflects incident lights with incident angles between 0 to 40 degrees, while its light transmission efficiency increases significantly for lights with incident angles over 40 degrees (e.g. 60 or 80 degrees). Therefore, as shown in FIG. 10, the light intensity of light originally emitted from the blue LED has a Lambertian distribution; i.e., the wider the angle of outgoing light is, the smaller the light intensity. Due to the effect of the edge-emitting filter plate 2, the distribution of the outgoing blue light changes into a distribution containing mainly light having output angle between 40 to 70 degrees. This way, the length of the light path of the blue light in the light transmitting plate increases greatly compared to the existing technology, and thus uniform mixture of lights can be achieved through propagations of just a few times.

If a display system only requires a monochromatic backlight source, the multiple solid state light sources have the same wavelength. In such a case, in a backlight source according to embodiments of the present invention, as shown in FIG. 5, the edge-emitting filter film 2' or the edge-emitting filter plate 2 can be merged into a single piece (not shown in the drawing).

In the above embodiments, based on cost concerns, the light transmitting plate 3 may be a plastic plate functioning as a support for the LCD panel 4. When the size of the LCD panel is relatively small, the light transmitting plate can be replaced by an air gap, which can be formed by using a number of support posts on the LCD panel 4.

The thickness of the LED chips is typically very small, such as about 0.1 mm. The light transmitting plate 3 may be provided with a plurality of recesses, as shown in FIG. 3, where the light transmitting plate 3 cooperates with the base to accommodate the light adjusting units and the solid state light sources in the recesses. As a result, the entire thickness of the backlight source can be less than 5 mm, achieving an ultra-thin backlight source.

In embodiments of the present invention, to reduce the thickness of the backlight source, the edge-emitting filter plates or films may be disposed immediately adjacent the solid state light sources. To increase the brightness of the backlight source, a low refractive index medium having a refractive index below 1.3 may be provided to fill the space between the edge-emitting filter plates or films and the solid state light sources. The low refractive index medium may be, for example, glue. Considering that filling with glue may cause the light emitting area of the solid state light sources to increase, resulting in reduced brightness, and considering that the refractive index of air is 1, an alternative approach is to provide an air gap between the edge-emitting filter plates or films and the solid state light sources. This can maximize the brightness of the solid state light sources.

According to another embodiment of the present invention, in lieu of edge-emitting filter plates, a first set of reflectors may be disposed at a desired distance above the solid state light sources to reflect small angle lights from the solid state light sources. Correspondingly, a second reflecting surface is disposed between the array of solid state light sources of below them, to reflect the lights reflected by the first set of reflectors back to the light transmitting unit. This way, large angle lights from the solid state light sources will be reflected out by the first set of reflectors, and small angle lights are reflected back to the solid state light sources where the light is scattered. The scattering changes the angle of the light, so that some lights become large angle lights and can be output.

Figure 7:
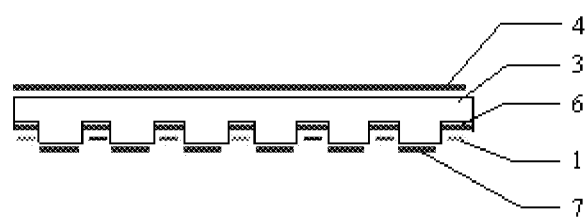
FIG. 7 schematically illustrates a backlight source of a LCD device according to a fourth embodiment of the present invention.

FIG. 7 illustrates a backlight source using the principle describes above. In this embodiment, the light transmitting unit is a light transmitting plate 3 with a predetermined a thickness and having a plurality of recesses on its bottom. The light transmitting plate 3 cooperates with the base to accommodate the light adjusting units and the corresponding solid state light sources in the corresponding recesses. The light adjusting unit is a reflector 6 disposed immediately adjacent a bottom of the recess or a reflecting film coated on the bottom surface of the recess. In areas where the light transmitting plate 3 contacts the base, the light transmitting plate 3 or the base is coated with a reflecting film 7; alternatively, a reflecting plate may be sandwiched between the light transmitting plate 3 and the base.

Figure 8A:
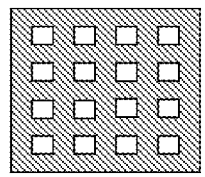
FIG. 8a is a plan view of the reflective plate 7 in FIG. 7.

In this structure, controlling the distance between the light adjusting unit (reflector 6) and the solid state light sources is critical. Preferably, the reflecting area of the reflector is set at approximately the same or slightly larger than the light emitting area of the solid state light source. To obtain output lights from the solid state light source with output angles greater than 60 degrees, for a LED chip having a bounding circle diameter L, the above distance should be between L/5 to L/10. FIG. 8a illustrates a plan view of a reflector 7 sandwiched between the light transmitting plate 3 and the base, where the multiple small rectangles correspond to an area reserved for the LEDs.

Figure 6:
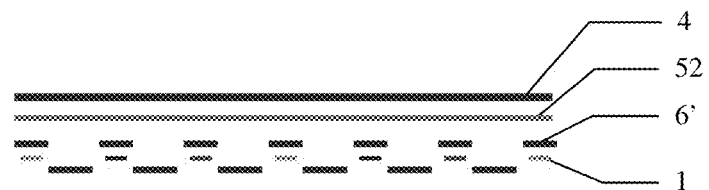
FIG. 6 schematically illustrates a backlight source of a LCD device according to a third embodiment of the present invention.
Figure 8B:
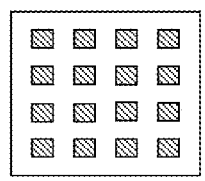
FIG. 8b is a plan view of the reflective plate 6 in FIG. 6.

FIG. 6 illustrates an alternative structure according to another embodiment of the present invention. The base has a polished surface between the solid state light sources, or reflective regions formed by a reflective material between the solid state light sources, as indicated by the shaded areas in the plan view of FIG. 8a. A light transmitting plate 6' is supported above the base, and has a structure in a plan view as shown in FIG. 8b. The light transmitting plate 6' has a plurality of areas coated with a reflective material as shown by the shaded areas in FIG. 8b, which function as the light adjusting units. A diffuser plate 52 is supported above the light transmitting plate 6' and functions as the light transmitting unit. In addition, a transparent body formed of a transparent material may be disposed in or fills the space between the diffuser plate 52 and the light transmitting plate 6'.

According to embodiments of the present invention, the distance between the diffuser 52 and the base in FIG. 6, or the thickness of the light transmitting plate 3 in FIG. 7, can be smaller than 5 mm.

The backlight source according to embodiments of the present invention can be used in a LCD device, which includes an LCD panel and the backlight source. The overall thickness of the LCD device can be reduced using such a backlight source.

It will be apparent to those skilled in the art that various modification and variations can be made in the backlight source and related method of the present invention without departing from the spirit or scope of the invention. Thus, it is intended that the present invention cover modifications and variations that come within the scope of the appended claims and their equivalents.

What is claimed is:

1. A method for making a backlight source with reduced thickness, comprising:
   placing a light emitting diode (LED) array including a plurality of LED chips below a light transmitting unit;
   wherein the light emitted by the LED chips are transmitted through the light transmitting unit as an output light of the backlight source;
   placing a plurality of light adjusting units between the LED array and the light transmitting unit, above the plurality of LED chips, wherein each light adjusting unit includes an edge-emitting filter plate or film which reflects incident lights having incident angles smaller than a threshold angle and transmits incident lights having incident angles larger than or equal to the threshold angle, wherein each light adjusting unit spatially corresponds to one LED chip; and
   providing, between each of the edge-emitting filter plates or films and the corresponding LED chip, an air gap having a thickness defined as a distance between the edge-emitting filter plate or film and a light emitting surface of the LED chip less than ⅕ of a bounding circle diameter of a light emitting area of the LED chip, and
   wherein each light adjusting unit reflects small-angle emitted light from the LED chip back to the LED chip, wherein the LED chip reflects or scatters the light reflected from the light adjusting unit back to the light adjusting unit at various angles, whereby a spatial distribution of light intensity of the light from the LED chips to the light transmitting unit is adjusted by the light adjusting units.

2. The method of claim 1, wherein the LED array includes a plurality of LED chips emitting lights of different wavelengths; and
   wherein each edge-emitting filter plate or film selectively transmits incident light within a predetermined wavelength range, the predetermined wavelength range corresponding to a wavelength range of lights emitted by the LED chip which spatially corresponds to the edge-emitting filter plate or film.

3. The method of claim 1, wherein the plurality of LED chips emit lights of the same wavelength, and
   wherein the plurality of edge-emitting filter plates or films are spatially joined to form one plate or film.

4. The method of claim 1, wherein the light transmitting unit is a light transmitting plate having a plurality of recesses, each recess being located to accommodate one edge-emitting filter plate or film and one corresponding LED chip.

5. The method of claim 4, wherein a thickness of the light transmitting plate is less than 5 mm.

6. A backlight source comprising:
a base;
a light emitting diode (LED) array including a plurality of LED chips disposed on the base;
a light transmitting unit disposed above the LED array;
a plurality of light adjusting units disposed between the LED array and the light transmitting unit, wherein each light adjusting unit includes an edge-emitting filter plate or film which reflects incident lights having incident angles smaller than a threshold angle and transmits incident lights having incident angles larger than or equal to the threshold angle, wherein each light adjusting unit spatially corresponds to one LED chip; and
an air gap between each of the edge-emitting filter plates or films and the corresponding LED chip having a thickness defined as a distance between the edge-emitting filter plate or film and a light emitting surface of the LED chip less than 1/5 of a bounding circle diameter of a light emitting area of the LED chip,
wherein each light adjusting unit reflects small-angle emitted light from the LED chip back to the solid state LED chip, and wherein the LED chip reflects or scatters the light reflected from the light adjusting unit back to the light adjusting unit at various angles, whereby a spatial distribution of light intensity of the light from the LED chips to the light transmitting unit is adjusted by the light adjusting units.

7. The backlight source of claim 6,
wherein the light transmitting unit is a light transmitting plate with a predetermined a thickness
wherein the edge-emitting filter plate is disposed adjacent the light transmitting plate or the edge-emitting filter film is coated on the light transmitting plate.

8. The backlight source of claim 6, wherein the plurality of LED chips emit lights of the same wavelength, and wherein the plurality of edge-emitting filter plates or films are spatially joined to form one plate or film.

9. The backlight source of claim 7, wherein the light transmitting plate has a plurality of recesses on its bottom, the light transmitting plate cooperating with the base to accommodate one edge-emitting filter plate or film and one corresponding LED chip in each recess.

10. A liquid crystal display device comprising a liquid crystal panel and a backlight source, wherein the backlight source comprises:
a base;
a light emitting diode (LED) array including a plurality of LED chips disposed on the base;
a light transmitting unit disposed above the LED array;
a plurality of light adjusting units disposed between the LED array and the light transmitting unit, wherein each light adjusting unit spatially corresponds to one LED chip, wherein each light adjusting unit includes an edge-emitting filter plate or film which reflects incident lights having incident angles smaller than a threshold angle and transmits incident lights having incident angles larger than or equal to the threshold angle; and
an air gap between each of the edge-emitting filter plates or films and the corresponding LED chip having a thickness defined as a distance between the edge-emitting filter plate or film and a light emitting surface of the LED chip less than 1/5 of a bounding circle diameter of a light emitting area of the LED chip,
wherein each light adjusting unit reflects small-angle emitted light from the LED chip back to the LED chip, and wherein the LED chip reflects or scatters the light reflected from the light adjusting unit back to the light adjusting unit at various angles, whereby a spatial distribution of light intensity of the light from the LED chips to the light transmitting unit is adjusted by the light adjusting units.

11. The liquid crystal display device of claim 10,
wherein the light transmitting unit is a light transmitting plate with a predetermined a thickness, and
wherein the edge-emitting filter plate is disposed adjacent the light transmitting plate or the edge-emitting filter film is coated on the light transmitting plate.

12. The liquid crystal display device of claim 10, wherein the plurality of LED chips emit lights of the same wavelength, and wherein the plurality of edge-emitting filter plates or films are spatially joined to form one plate or film.

* * * * *